(12) United States Patent
Benner et al.

(10) Patent No.: US 6,174,034 B1
(45) Date of Patent: Jan. 16, 2001

(54) KIT FOR A RACK WITH A CORNER CONNECTOR FOR VERTICAL FRAME PIECES

(75) Inventors: Rolf Benner; Martina Köhler, both of Herborn; Udo Münch, Sinn; Wolfgang Reuter, Burbach, all of (DE)

(73) Assignee: Rittal-Werk Rudolf Loh GmbH & Co. KG, Herborn (DE)

( * ) Notice: Under 35 U.S.C. 154(b), the term of this patent shall be extended for 0 days.

(21) Appl. No.: 09/308,353

(22) PCT Filed: Nov. 6, 1997

(86) PCT No.: PCT/EP97/06146

§ 371 Date: May 18, 1999

§ 102(e) Date: May 18, 1999

(87) PCT Pub. No.: WO98/23006

PCT Pub. Date: May 28, 1998

(30) Foreign Application Priority Data

Nov. 19, 1996 (DE) .............................................. 196 47 803

(51) Int. Cl.[7] .................................................. A47G 29/00
(52) U.S. Cl. ........................................... 312/265.4; 211/26
(58) Field of Search ............................. 312/265.1, 265.2, 312/265.3, 265.4, 223.1, 264, 257.1; 211/189, 190, 191, 26

(56) References Cited

U.S. PATENT DOCUMENTS

| 2,167,525 | * | 7/1939 | Rosendale | 312/257.1 |
| 5,498,073 | * | 3/1996 | Charbonneau et al. | 312/265.4 |

FOREIGN PATENT DOCUMENTS

| 0 533 555 B1 | | 3/1993 | (EP) . |
| 2551303 | * | 3/1985 | (FR) . |
| 2231117 | * | 11/1990 | (GB) . |

* cited by examiner

Primary Examiner—Peter M. Cuomo
Assistant Examiner—Jerry A. Anderson
(74) Attorney, Agent, or Firm—Pauley Petersen Kinne & Fejer

(57) ABSTRACT

A switching cabinet having a rack with an upper and lower frame and vertical and horizontal struts which are disposed horizontally. The upper and lower frame have corner cavities, to which vertical frame profiles can be connected. The vertical frame profiles have profiled segments which are turned towards an inside of the rack. Access to the inside of the rack is improved when the vertical frame profiles may be mounted or dismounted afterwards which can be done with few components and involves little effort during mounting by including vertical profiles on at least one side of the rack, whose ends and profiled segments can be inserted into the corner cavity from the outer side of the rack, and by placing and fixing the profiled segments onto the connector of a corner cavity.

10 Claims, 1 Drawing Sheet

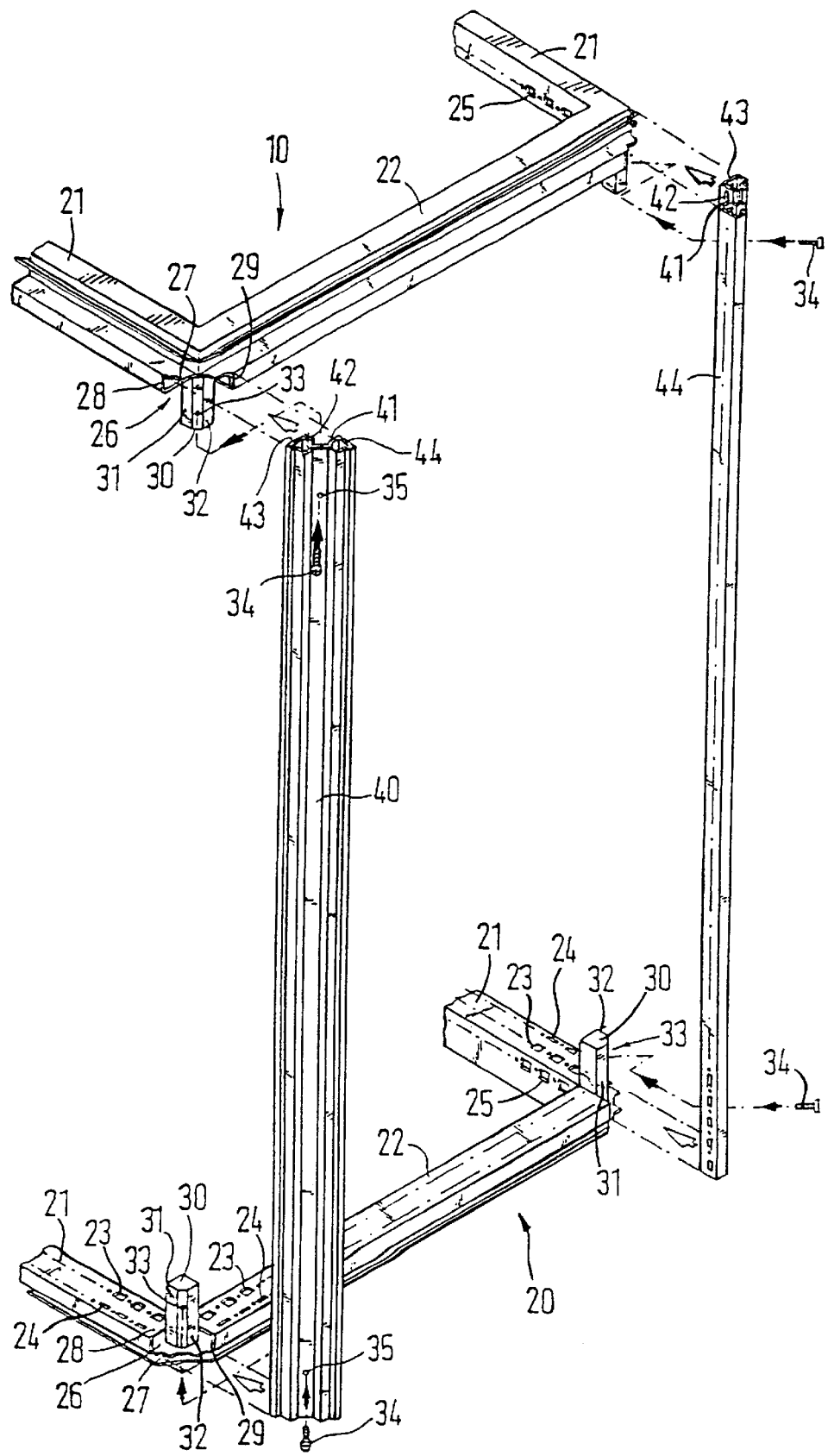

KIT FOR A RACK WITH A CORNER CONNECTOR FOR VERTICAL FRAME PIECES

BACKGROUND OF THE INVENTION

1. Field of the Invention

This invention relates to a switching cabinet with a rack which has a lower and upper frame with horizontal width and depth struts wherein the lower and the upper frame have corner cavities wherein vertical frame profiles can be attached and wherein the vertical frame profiles have profiled parts turned toward the inside of the rack.

2. Description of Prior Art

Such a frame is known from European Patent Reference EP 0 533 555 B1. The vertical frame profiles are formed as hollow profiles. To form a rack individual frame profiles are assembled adjacent to one another at ends by corner connectors. The corner connectors have various individual parts. Each pair of depth and width struts of the lower and upper frame are connected perpendicularly to one another of one of these individual parts. Additional individual parts are installed in the hollow chambers with connecting plugs running in the longitudinal direction of the frame profiles and fixedly connected to the frame profiles. To complete the corner connection the vertical frame profiles are then screwed onto the individual parts of the lower and upper frame with their individual parts mounted on the end side.

This type of the corner connection is very expensive. For the individual connectors a high production cost is necessary. The individual parts of the connector must be matched precisely with one another in order to insure that the individual frame profiles are aligned perpendicularly to one another. Also the expenditure for mounting is significant since all the vertical frame profiles and the depth and width struts are equipped with the individual parts of the connector.

Still other racks are known in which connectors have three connecting plugs perpendicular to one another. The connecting plugs can be plugged into hollow chambers of the vertical frame profiles and the lower and upper struts. With these connectors rigid connections are in fact generated in the corner of the rack. However, it is not possible to mount or dismount the vertical frame profiles afterwards without the entire rack having to be disassembled in the process. The dismounting of a frame profile can, for example, be required in order to simplify access to the inside of the rack.

SUMMARY OF THE INVENTION

It is one objective of this invention to provide a switching cabinet of the type mentioned initially in which the vertical frame profiles can be mounted on the rack or dismounted from the rack with little expenditure on parts or mounting.

This objective of this invention is accomplished with vertical frame profiles that can be pushed at ends by their profile parts into corner cavities from an outer side of the rack at least on one side of the rack and the profile parts can be placed on and affixed to a connector of the corner cavity.

The corner cavity is formed so that the vertical frame profile can be mounted or dismounted from it on a rack already placeably mounted. Thereby no additional individual parts mounted on the vertical frame profile are needed since fastening of the frame to the connector profile follows directly.

According to a preferred embodiment of this invention, the vertical frame profiles with their profile parts form an open outer slot pointing to an inside of the rack for receiving the connector. The two profile parts can, for example, be perpendicular to one another and thus form a corner cavity. The two profile parts are then placed on correspondingly formed stops of the connector and centered on them. Thus the vertical frame profiles can, for example, be aligned exactly perpendicularly to the depth and width struts of the lower and upper frame. The outer slot being open outwards insures that the frame profile can be introduced simply from the outer side of the rack into the corner cavity.

Additionally or alternatively the corner cavities of the upper and lower frame can form corner cavities open outwards into which the ends of the frame profiles can then be pushed.

In one embodiment of this invention the vertical frame profiles are connected interchangeably with the connectors. Thus the vertical frame profiles have at their ends one or more screw holes which can be disposed flush to the threaded holes of the connectors and fastening screws can be introduced into the screw holes accessible from the outer side of the rack and can be screwed into the threaded holes. The mounting of the vertical frame profiles is thus simple. The vertical frame profiles can by screwed on comfortably from the outer side of the rack. At this point the fastening screws are easily accessible. In order to achieve good support of the vertical frame profiles, in a preferred embodiment of this invention, the connectors project over the upper or lower frame in an axial direction of the vertical frame profile and the vertical frame profiles are supported by the front side up to the free end of the connector.

If the corner cavity has a plane supporting surface on which the connector and the front end of the vertical frame profile are set, then the vertical frame profile can be aligned simply to the fastening points of the connector. If the vertical frame profiles are screwed onto the connector, then the corresponding screw holes and the threaded holes are disposed flush to one another.

BRIEF DESCRIPTION OF THE DRAWING

This invention is explained in the following with the aid of an embodiment shown in the drawing in an exploded perspective view.

DESCRIPTION OF PREFERRED EMBODIMENTS

In the single drawing a section of a rack for a switching cabinet is shown in a perspective view. The rack has an upper and lower frame 10 and 20 which can be formed identically so that they can be interchanged. The upper and lower frame 10 and 20 comprise depth and width struts 21 and 22 running perpendicular to one another. The depth and width struts 21 and 22 have, turned towards the inside of the rack, two profiled sides which have rows 23, 24, and 25 of fastening holes. The rows 23, 24, and 25 of fastening holes are spaced from one another at equal intervals.

Corner cavities 26 are formed at the mutually abutting ends of the depth and width struts 21 and 22. The corner cavities 26 have a plane supporting surface 27 on which the one connector 30 is set. The connector 30 is essentially formed as a square. At one of its vertical edges the connector 30 has a bevel into which one or more threaded holes 33 are introduced. The bevel points to the outer side of the rack. For fastening, the connector 30 is set on the supporting surface 27. With its lateral faces turned toward the inside of the switching cabinet the connector 30 lies at the front ends of the depth and width struts 21 and 22 which serve as guides 28, 29. In this position the connector 30 can be welded into the corner cavity 26. The connector 30 is thereby disposed exactly perpendicular to its associated depth and width struts 21 and 22. The guides 28 and 29 as well as the supporting surface 27 form a cavity open outwards for the front end of a vertical frame profile 40. The vertical frame profile 40 has an open outer slot turned toward the inside of the rack. This outer slot is bounded by two profiled parts 41, 42. The profiled parts 41, 42 run in the longitudinal direction of the frame profile 40 and are perpendicular to one another.

In the case of the mounted frame profile 40, the profiled parts 41, 42 abut the stops 31, 32 of the connector 30. Perpendicular to the profiled parts 41, 42, contact faces 43, 44 are adjacent to the vertical frame profile 40. The contact faces 43, 44 lie on the guides 28, 29 of the corner cavity 26. For fastening of the vertical frame profiles 40, one or more screw holes 35 are introduced in an area of each of the front ends. The screw hole 35 can be disposed flush to the threaded hole 33 of the connector 30. To simplify mounting, the spacing from the front end of the frame profile to the center of the hole of the screw hole 35 is matched to the spacing from the supporting surface 27 to the threaded hole 33. A fastening screw 34 can be guided through the screw hole 35 and screwed into the threaded hole 33 of the connector 30. Thereby the profiled parts 41, 42 are secured in place on the stops 31 and 32 of the connector 30. At the same time the vertical frame profile 40 is drawn into the corner cavity 26 on the guides 28, 29. In its final mounted position the frame profile 40 is fixedly attached to the connector 30 and aligned exactly vertically.

The drawing shows that the vertical frame profile can be introduced in the corner cavity 26 from the outer side of the rack. The vertical frame profile can therefore also still be mounted or dismounted afterwards in the case of a pre-mounted rack. Thus the inside of the rack can be made easily accessible. For example, an independently placeable unit of lower and upper frame 10 and 20 and the two back vertical frame profiles 40 can be set up. This independently placeable part rack can then be assembled with electronic inserts or the like. Subsequently the two front vertical frame profiles 40 can be mounted so that the rack is complete. In order to protect the inside of the rack from the effects of the environment, the open sides of the rack can be customarily covered with lateral walls and a cover. On the front, a door is hinged.

What is claimed is:

1. In a switching cabinet having a rack with a lower frame and an upper frame with horizontal width struts and depth struts wherein the lower frame and the upper frame have corner cavities to which vertical frame profiles can be attached and wherein the vertical frame profiles have profiled parts turned toward an inside of the rack, the improvement comprising:

ends of the vertical frame profiles (40) pushed with the profile parts (41, 42) into the corner cavities (26) from an outer side of the rack at least on one side of the rack, and the profile parts placed on and affixed to a connector (30) of the corner cavity (26);

the vertical frame profiles (40) with the profile parts (41, 42) forming an open outer slot pointing to the inside of the rack for receiving the connector (30); and the upper frame and the lower frame (10 and 20) carrying the connector (30) in the corner cavities (26) open to the outer side of the rack and the connector (30) having a plurality of stops (31, 32) pointing to the outer side of the rack on which the profiled parts (41, 42) of the vertical frame profiles (40) are positioned.

2. In a switching cabinet according to claim 1 wherein the connectors (30) project over one of the upper frame and the lower frame (10 and 20) in an axial direction of the vertical frame profiles (40) and support the vertical frame profiles (40) from a front side to a free end of the connector (30).

3. In a switching cabinet according to claim 1 wherein the vertical frame profiles (40) are connected interchangeably to the connectors (30).

4. In a switching cabinet according to claim 3 wherein the vertical frame profiles (40) have at ends at least one screw hole (35) each disposed flush to threaded holes (33) of the connector (30) and a plurality of fastening screws (34) introduced into the screw holes (35) accessible from the outer side of the rack and screwed into the threaded holes (33).

5. In a switching cabinet according to claim 4 wherein the connectors (30) project over one of the upper frame and the lower frame (10 and 20) in an axial direction of the vertical frame profiles (40) and support the vertical frame profiles (40) from a front side to a free end of the connector (30).

6. In a switching cabinet according to claim 5 wherein the corner cavity (26) has a plane supporting surface (27) on which the connector (30) and the front end of the vertical frame profile (40) are set.

7. In a switching cabinet having a rack with a lower frame and an upper frame with horizontal width struts and depth struts wherein the lower frame and the upper frame have corner cavities to which vertical frame profiles can be attached and wherein the vertical frame profiles have profiled parts turned toward an inside of the rack, the improvement comprising:

ends of the vertical frame profiles (40) pushed with the profile parts (41, 42) into the corner cavities (26) from an outer side of the rack at least on one side of the rack, and the profile parts placed on and affixed to a connector (30) of the corner cavity (26); and the corner cavity (26) having a plane supporting surface (27) on which the connector (30) and the front end of the vertical frame profile are set.

8. In a switching cabinet according to claim 7 wherein the upper frame and the lower frame (10 and 20) carry the connector (30) in the corner cavities (26) open to the outer side of the rack and the connectors (30) have a plurality of stops (31, 32) pointing to the outer side of the rack on which the profiled parts (41, 42) of the vertical frame profiles (40) are positioned.

9. In a switching cabinet according to claim 7 wherein the vertical frame profiles (40) are connected interchangeably to the connectors (30).

10. In a switching cabinet according to claim 9 wherein the vertical frame profiles (40) have at ends at least one screw hole (35) each disposed flush to threaded holes (33) of the connector (30) and a plurality of fastening screws (34) introduced into the screw holes (35) accessible from the outer side of the rack and screwed into the threaded holes (33).

* * * * *